United States Patent [19]
Hockley et al.

[11] 3,879,081
[45] Apr. 22, 1975

[54] MOTOR TRUCK CAB CONVERSION TO A SLEEPER

[75] Inventors: Jack E. Hockley; Ciro M. F. Rizzi, both of Highton, Victoria, Australia

[73] Assignee: International Harvester Company, Chicago, Ill.

[22] Filed: Sept. 17, 1973

[21] Appl. No.: 398,918

[52] U.S. Cl. .................................. 296/28 C; 5/118
[51] Int. Cl. .......................................... B62d 27/00
[58] Field of Search .............. 296/24 R, 28 C; 5/118

[56] References Cited
UNITED STATES PATENTS
2,140,968  12/1938  Paranzino ..................... 296/24 R
FOREIGN PATENTS OR APPLICATIONS
590,850   7/1947  United Kingdom .............. 296/24 R
939,553   2/1956  Germany ....................... 296/28 C
1,455,836  4/1969  Germany ....................... 296/24 R Primary Examiner—Robert J. Spar
Assistant Examiner—Ross Weaver
Attorney, Agent, or Firm—Frederick J. Krubel; Floyd B. Harman

[57] ABSTRACT

A motor truck cab incorporating a support upon which the driver or another person may recline and formed by a fixed shelf and an extended panel located behind the seats in the cab, and movable between the position co-extending with the fixed panel when in use and a non-operating position extending substantially vertically downwardly behind the seats.

11 Claims, 3 Drawing Figures

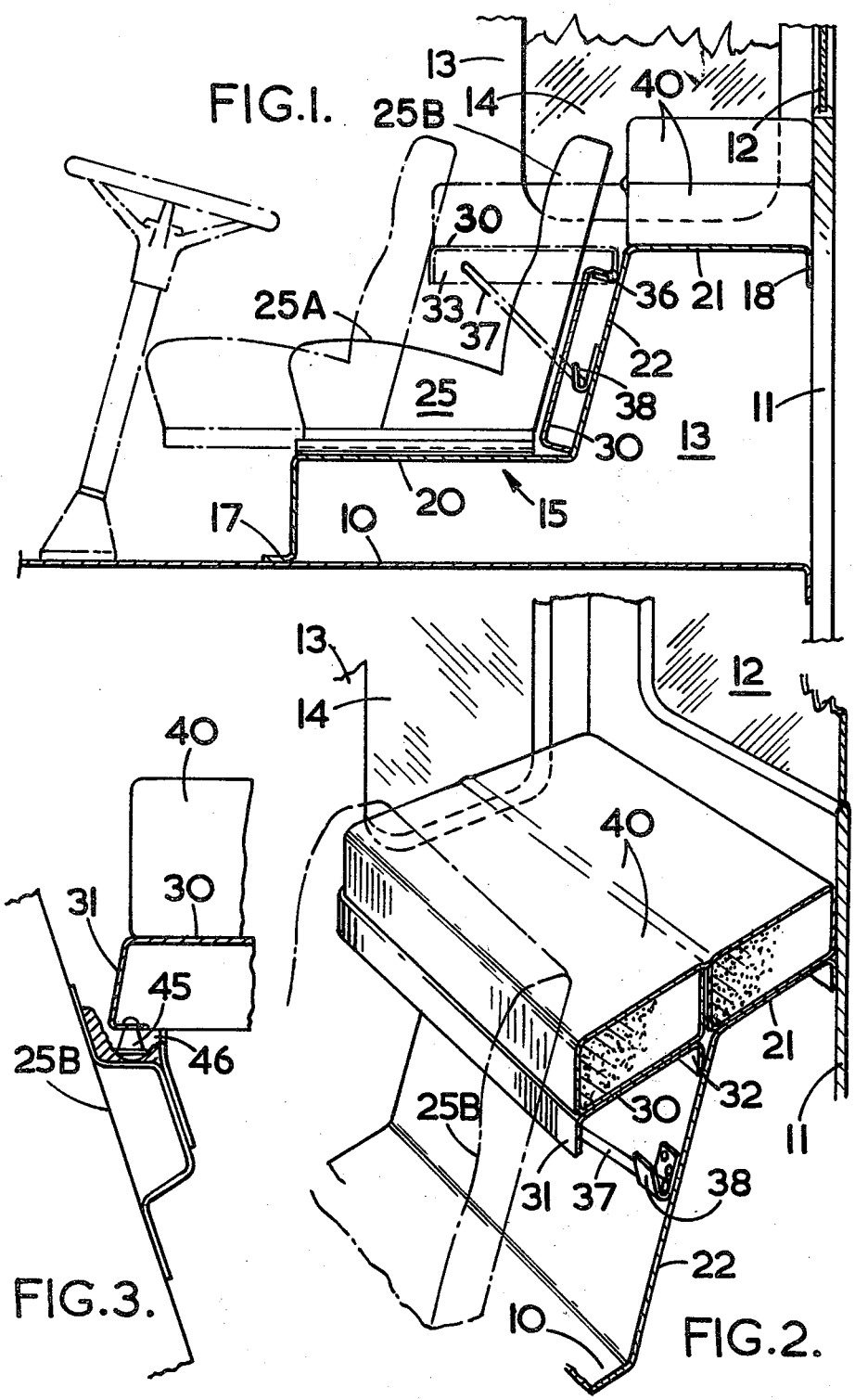

MOTOR TRUCK CAB CONVERSION TO A SLEEPER

This invention relates to a cab of a motor truck in which there is incorporated provision to enable a person, such as the driver, to sleep. It is desirable in motor trucks engaged in long-distance haulage to make provision to enable the driver to sleep in comfort in the cab of the truck. This enables the driver to rest whenever he becomes tired, without having to arrange his rest period to coincide with roadside rest facilities.

It is the object of this invention to provide in a motor truck cab a base upon which a mattress or like upholstered support may be arranged, without interference with the seating arrangements in the cab when occupied, and yet does not necessitate a substantial enlargement in the size of the cab.

With this object in view there is provided in a motor truck cab having a rear wall and a seat or seats spaced forwardly from the rear wall, a shelf member extending forwardly from the rear wall and between opposite sides of the cab, an extension panel pivotally supported for movement about a horizontal axis substantially parallel to the forward edge of the shelf between a horizontal position forming a forward extension of the shelf and a lowered position projecting downwardly from the forward edge of the shelf rearwardly of the seat or seats, and means to support the extension panel in the horizontal position so that a person may recline upon the surface formed by the shelf and the panel.

Conveniently, one or more stay members may be provided as the means to support the panel in the horizontal position. The stay members may be secured to the extension panel, or a part of the body of the cab, for movement between an operating position to support the panel in the horizontal position, and a retracted position to permit the downward movement of the panel to an inoperative position.

Preferably co-active components are provided on the panel and on the seat or seats in the cab, the components being arranged to interengage when the panel is in the horizontal position to support the latter, and to be releasable to allow pivoting of the panel to the lowered position.

Conveniently, the seats are mounted so that they may slide forwardly and rearwardly in the cab to permit raising and lowering of the panel, or alternatively, the seats may pivot about a horizontal axis between the normal operating position and a forwardly inclined position. If desired, where two separate seats are provided, one may be slidably mounted and the other pivotedly mounted.

More particularly, a motor truck cab includes at least one seat slidably mounted on a substantially horizontal floor panel to allow fore and aft movement thereon, a riser panel disposed rearwardly of the seat and extending upwardly from said floor panel across the full width of the cab, a shelf panel extending rearwardly from the upper end of said riser panel in a substantially horizontal direction, an extension panel extending across the width of the cab pivotally connected to the riser panel for angular movement between a folded position substantially parallel to the riser panel and an extended substantially horizontal position coextensive with the shelf panel, and means to support the extension panel in the horizontal position so that a person may recline upon the surface formed by the shelf and the extension panel.

Conveniently the support means comprise at least one strut member anchored to said riser or extension panel, such that when the seat is moved to a forward position, the extension panel is free for angular movement to the extended horizontal position and supported therein by the strut member.

The invention will be more readily understood from the following description of two alternative arrangements of a truck cab incorporating provision for the driver to recline therein, and as illustrated in the accompanying drawings.

In the drawings:

FIG. 1 is a sectional elevation of a portion of the cab of a truck showing one embodiment of the invention with the extension panel shown in full outline in the inoperative position;

FIG. 2 is an enlarged sectional perspective view of a portion of the cab shown in FIG. 1 with the extension panel in the operative position; and FIG. 3 is a fragmentary view showing an alternative means of supporting the extension panel in the operative position.

Referring now to the drawings the cab is generally of conventional construction having a floor panel 10, a rear wall 11 fitted with a window 12, and opposite the side walls 13 (only one is shown) with a window 14. Provided within the cab is a formed sheet metal member 15, extending the full width of the cab between the side walls 13, and secured at 17 to the floor panel 10, and at 18 to the rear wall 11. The member 15 provides a horizontal seat support section 20, a shelf panel 21, and a riser panel 22 extending upwardly therebetween. A pair of conventionally constructed seat assemblies 25 (only one is shown) is slidably mounted in the known manner on the seat support section 20 for fore and aft position adjusting movement within the cab to accommodate vechicle operators of various sizes. Each of the seat assemblies 25 includes a bottom seat portion 25a and a back rest portion 25b. It is also to be understood that in lieu of a pair of seat assemblies 25, a single, so called "bench" type, seat assembly, extending the full width of the cab, could be provided without departing from the spirit and scope of the invention. Furthermore, one or both of the back rest portions 25b of each seat assembly 25, or the single back rest portion in the case of a bench type seat assembly, may be connected to its respective bottom seat portion 25a so as to be capable of being pivoted forwardly with respect thereto from the position assumed thereby during normal operation of the motor truck.

The extension panel 30 has down turned front and rear flanges 31 and 32 and transverse stiffener members 33 extending between the flanges. The extension panel 30 is pivotally connected to the riser panel 22 adjacent the upper end thereof by suitable hinges 36, for angular movement between an inoperative lowered or stored position extending generally downwardly parallel to the riser panel 22, and an operative, raised or extended position wherein it is coextensive with the shelf panel 21 and lies in substantially the same horizontal plane containing the shelf panel 21. The extension panel 30 is supported in the operative or raised position by a number of laterally spaced stay members 37 attached to the underside of the extension panel and receivable in a hooklike anchor member 38 attached to the riser panel 22. The stay members 37 are pivotally connected to respective stiffener member 33, so that when the extension panel is in the inoperative or lowered position the stay members are secluded between the front and rear flanges 31, 32. It will also be noted that when the extension panel 30 is in its inoperative or stored position and the back rest portion 25b (or back rest portions) is positioned to accommodate a vehicle operator thereon for driving the vehicle, the horizontal spacing between the back rest portion 25b and the stored extension panel is insufficient to permit swinging of the extension panel 30 to its extended position. This fact is evidenced by viewing FIG. 1. In order to permit swinging of the extension panel 30 to its extended position, it is necessary to move the back rest portion 25b forwardly to a position wherein the back rest portion 25b is not in the path of movement of the extension panel 30, as shown by broken lines in FIG. 1. When the seat back rest portion 25b is in this forward position, the motor vehicle cannot be operated in a normal manner since a vehicle operator cannot be properly seated upon the seat 25 assembly when in such forward position.

Conveniently the shelf panel can accommodate the divided mattress 40 having two sections, which can be unfolded when the extension panel is in the operative position, to be located side-by-side as shown in FIG. 2, and serve as a comfortable bed for a driver or passenger of the motor truck. When not in use the two sections of the mattress may be stored one above the other on the shelf panel 21 as shown in FIG. 1.

In use, when it is desired to convert the cab to a sleeper, the seat assemblies 25 are moved forwardly to the broken line position of FIG. 1 and the extension panel is thereafter angularly moved to the extended or raised operative position coextensive with the shelf panel, and is supported in this position by the stay members 37.

In the alternative construction shown in FIG. 3 the stay members 37 are dispensed with, and two small feet 45 (only one shown) are provided on the underside of the front flange 31 of the extension panel 30. In addition, on the rear of each of the two separate seat back rest portions 25b of the seat assemblies 25, there are provided sockets 46 to receive the feet 45. The position of the sockets 46 is such that when the seat back rest portion 25b is moved forward as by sliding both entire seat assemblies 25 including the back rest portions 25b and bottom seat portions 25a the extension panel 30 can be raised above the level of the sockets 46 without interference therewith, and the seat back rest portions 25b are then moved slightly backward to permit the panel 30 to be lowered to bring the feet 45 into engagement with the socket 46. When the feet and sockets are in engagement, the top face of the extension panel is conextensive with the top face of the shelf panel 21 so that the mattress may be positioned thereon.

If the seat assemblies 25 are of the known construction that permits the seat back rest portions 25b to be pivoted about a horizontal axis relative to their respective seat bottom portions 25a mounting, then this relative pivotal movement of the seat back rest portions 25b may be employed either solely or in conjunction with forward sliding of both entire seat assemblies 25 to provide sufficient horizontal spacing between the back rest portions 25b and the extension panel 30 in order to facilitate raising and lowering of the extension panel. Also it is possible to use a combination of sliding and pivotal movements of the seats for this purpose. Also it is possible to use a combination of sliding and pivotal movements of the seats for this purpose.

What is claimed is:

1. In a cab for a motor truck, the combination comprising,
   a generally horizontally disposed seat support panel means;
   a generally vertically extending riser panel extending upwardly from said seat support panel means and transversely across the full width of the cab;
   a shelf panel extending rearwardly and substantially horizontally from the uppermost transverse edge of said riser panel;
   a generally rectangularly shaped extension panel having a transverse length substantially coextensive with said shelf panel and having a transversely extending edge pivotally connected to said riser panel adjacent the uppermost transverse edge thereof, said extension panel being swingable between a lowered, stored position wherein it lies substantially parallel to said riser panel and a raised, extended position wherein it lies substantially in the plane containing said shelf panel;
   manually operable means for supporting said extension panel in its raised, extended position; and
   seat assembly means mounted on said seat support panel means forwardly of said riser panel, said seat assembly means having a section thereof normally positioned so as to be horizontally spaced a distance less than the length of said extension panel measured perpendicular to the pivotal axis thereof during normal operation of the motor truck and in the path of movement of said extension panel as it is swung between its lowered, stored and raised, extended positions whereby said section of said seat assembly means precludes swinging of said extension panel from its lowered, stored position to its raised, extended position, said section of said seat assembly means being movable forwardly with respect to said riser panel to an inoperative position and out of the path of movement of said extension panel as it is swung between its lowered, stored and raised, extended positions wherein said extension panel may be freely swung to its raised, extended position from its lowered, stored position.

2. In a cab for a motor truck as set forth in claim 1, wherein
   said manually operable means for supporting said extension panel in its raised, extended position includes
   elongated stay member means having one of its longitudinal ends operatively connected to a respective one of said extension and riser panels, and
   means for selectively operatively connecting the opposite longitudinal end of stay member means to the respective other one of said extension and riser panels, said means when operatively connecting said opposite longitudinal end of said stay means to the respective other one of said extension and riser panels providing a rigid support between said extension and riser panels to maintain said extension panel in its raised, extended position.

3. In a cab for a motor truck as set forth in claim 2 wherein said elongated stay member means comprises a pair of transversely spaced, elongated stay members, each of said stay members having a respective longitudinal end pivotally connected to the extension panel for relative pivotal movement with respect thereto, and said means for selectively operatively connecting the opposite longitudinal end of said stay member means to the respective other one of said extension and riser panels includes a pair of transversely spaced anchor members carried by said riser panel, the free longitudinal end of each of said stay members being operatively engageable with a respective one of said anchor members when said extension panel is in its raised, extended position to support the same in the plane containing said shelf panel, said stay members being releasable from operative connection with said anchor members to permit swinging of said extension panel to its lowered, stored position.

4. In a cab for a motor truck as set forth in claim 1, wherein said seat assembly means is supported on said seat support panel means for horizontal sliding movement in a fore and aft direction with respect to the cab.

5. In a cab for a motor truck as set forth in claim 1, wherein said seat assembly means includes a generally horizontally disposed bottom seat portion means, and a generally vertically extending back rest portion means, said section of said seat assembly means precluding swinging of said extension panel from its lowered, stored position to its raised, extended position during normal operation of the motor truck comprising uppermost section means of said back rest portion means.

6. In a cab for a motor truck as set forth in claim 1, wherein said seat assembly means includes bottom seat portion means and back rest portion means, said back rest portion means being pivotal about a horizontally, transversely extending axis with respect to said seat bottom portion means, and uppermost section means of said back rest portion means being horizontally spaced a distance less than the length of said extension panel measured perpendicular to the pivotal axis of the extension panel during normal operation of the motor truck whereby said uppermost section means of said back rest portion means precludes swinging of said extension panel from its lowered, stored position to its raised, extended position, said uppermost section means of said back rest portion means being capable of moving forwardly with respect to said riser panel to said inoperative position upon pivoting of said back rest portion means with respect to said seat bottom portion means, said uppermost section means being horizontally spaced a distance greater than the length of said extension panel measured perpendicular to the pivotal axis of the extension panel when in its inoperative position whereby said extension panel may be freely swung to its raised, extended position from its lowered, stored position.

7. In a cab for a motor truck as set forth in claim 4, wherein said manually operable means for supporting said extension panel in its raised extended position includes elongated stay member means having one of its longitudinal ends operatively connected to a respective one of said extension and riser panels, and means for selectively operatively connecting the opposite longitudinal end of said stay member means to the respective other one of said extension and riser panels, said means when operatively connecting said opposite longitudinal end of said stay member means to the respective other one of said extension and riser panels providing a rigid support between said extension and riser panels to maintain said extension panel in its raised, extended position.

8. In a cab for a motor truck as set forth in claim 5, wherein said manually operable means for supporting said extension panel in its raised, extended position includes elongated stay member means having one of its longitudinal ends operatively connected to a respective one of said extension and riser panels, and means for selectively operatively connecting the opposite longitudinal end of said stay member means to the respective other one of said extension and riser panels, said means when operatively connecting said opposite longitudinal end of said stay member means to the respective other one of said extension and riser panels providing a rigid support between said extension and riser panels to maintain said extension panel in its raised, extended position.

9. In a cab for a motor truck as set forth in claim 1, wherein said manually operable means for supporting said extension panel in its raised, extended position includes cooperating components mounted respectively on said extension panel and said seat assembly means said cooperating components being operatively interengageable to support said extension panel in its raised, extended position when said seat assembly means section is in a predetermined fore and aft position intermediate its normal and inoperative positions, said cooperating components being operatively disconnectable to permit swinging of said extension panel to its lowered, stored position.

10. In a cab for a motor truck as set forth in claim 9, wherein said cooperating components mounted respectively on said extension panel and seat assembly means includes a pair of transversely spaced feet carried by said extension panel, and a pair of transversely spaced generally upwardly opening sockets carried by said uppermost section means of said back rest portion means, each of said feet being insertable in a respective one of said sockets to support said extension panel in its raised extended position.

11. In a cab for a motor truck as set forth in claim 10 wherein said back rest portion means is supported for pivotal movement about a horizontally, transversely extending axis with respect to said seat bottom portion means, said uppermost section means of said back rest portion means being capable of moving forwardly with respect to said riser panel between its normal, predetermined and inoperative positions upon pivoting of said back rest portion means with respect to said seat bottom portion means, said uppermost section means being spaced a horizontal distance greater than the length of said extension panel measured perpendicular to the pivotal axis of the extension panel when in its inoperative position whereby said extension panel may be freely swung to its raised, extended postion from its lowered, stored position.

* * * * *